(12) United States Patent
Nilsson et al.

(10) Patent No.: US 8,325,807 B2
(45) Date of Patent: Dec. 4, 2012

(54) VIDEO CODING

(75) Inventors: Michael E Nilsson, Ipswich (GB); Stephen C Appleby, Colchester (GB)

(73) Assignee: British Telecommunications public limited company, London (GB)

(*) Notice: Subject to any disclaimer, the term of this patent is extended or adjusted under 35 U.S.C. 154(b) by 1031 days.

(21) Appl. No.: 12/295,772

(22) PCT Filed: Apr. 3, 2007

(86) PCT No.: PCT/GB2007/001234
§ 371 (c)(1), (2), (4) Date: Oct. 2, 2008

(87) PCT Pub. No.: WO2007/113559
PCT Pub. Date: Oct. 11, 2007

(65) Prior Publication Data
US 2010/0150241 A1    Jun. 17, 2010

(30) Foreign Application Priority Data
Apr. 3, 2006 (EP) ................................ 06251885

(51) Int. Cl.
*H04N 7/12* (2006.01)
(52) U.S. Cl. ......... 375/240.13; 375/240.12; 375/240.14; 375/240.01; 382/236; 382/238
(58) Field of Classification Search ............. 375/240.01, 375/240.12, 240.13, 240.14; 382/236, 238
See application file for complete search history.

(56) References Cited

U.S. PATENT DOCUMENTS

| 5,764,293 | A | 6/1998 | Uz et al. |
|---|---|---|---|
| 6,167,085 | A | 12/2000 | Saunders et al. |
| 6,411,738 | B2 | 6/2002 | Fert et al. |
| 2003/0031255 | A1 | 2/2003 | Cougnard et al. |
| 2003/0046064 | A1* | 3/2003 | Moriya et al. ................ 704/201 |
| 2003/0156642 | A1 | 8/2003 | Ruol |
| 2004/0175049 | A1* | 9/2004 | Yamamoto et al. ........... 382/236 |
| 2005/0053139 | A1* | 3/2005 | Park ........................ 375/240.16 |

(Continued)

FOREIGN PATENT DOCUMENTS
EP    1 465 430    10/2004
(Continued)

OTHER PUBLICATIONS

Yokoyama, Y., et al., "A Rate Control Method With Pre-Analysis for Real-Time MPEG-2 Video Coding," Proceedings IEEE. 2001 International Conference on Image Processing, vol. 3, pp. 514-517 vol. 3, Meeting Date: Oct. 7, 2001-Oct. 10, 2001, Thessaloniki, Greece, ISBN: 0-7803-6725-1.

(Continued)

*Primary Examiner* — Edan Orgad
*Assistant Examiner* — Roderick Tolentino
(74) *Attorney, Agent, or Firm* — Nixon & Vanderhye P.C.

(57) ABSTRACT

A video signal is coded using predictive coding. The degree of quantization that is applied is varied as a function of measures of predictive power, the idea being that a picture that is useful as a predictor for other pictures is worth coding well. These measures are formed in a pre-analysis of the pictures to obtain, for each macroblock analysed, a measure that depends on its similarity to a region for which it is a potential predictor. Preferably these measures are cumulative.

8 Claims, 3 Drawing Sheets

U.S. PATENT DOCUMENTS

| | | |
|---|---|---|
| 2005/0175091 A1 | 8/2005 | Puri et al. |
| 2005/0286629 A1 | 12/2005 | Dumitras et al. |
| 2006/0044420 A1* | 3/2006 | Iguchi et al. ............. 348/231.99 |
| 2006/0067407 A1* | 3/2006 | Kitamura ................. 375/240.18 |
| 2006/0147123 A1* | 7/2006 | Kajihata ....................... 382/239 |
| 2009/0074313 A1* | 3/2009 | Ogawa ......................... 382/238 |

FOREIGN PATENT DOCUMENTS

| | | |
|---|---|---|
| EP | 1 465 430 A2 | 10/2004 |
| WO | 2004/004359 | 1/2004 |
| WO | 2004/004359 A1 | 1/2004 |

OTHER PUBLICATIONS

International Search Report for PCT/GB2007/001234, mailed May 31, 2007.

\* cited by examiner

VIDEO CODING

This application is the U.S. national phase of International Application No. PCT/GB2007/001234, filed 3 Apr. 2007, which designated the U.S. and claims priority to filed Europe Application No. 06251885.7, filed 3 Apr. 2006, the entire contents of each of which are hereby incorporated by reference.

BACKGROUND AND SUMMARY

The present invention is concerned with video coding.

Video compression techniques developed over the last 20 years have been based on motion compensated transform coding. The basic idea is to encode one image, and use this image as a prediction for the next image, thus removing temporal redundancy, and encode the prediction residual with a block based transform coding technique. Each subsequent image can be predicted from the previously encoded image(s).

The source picture is usually divided into 16×16 regions called macroblocks. The encoder searches one or more previously encoded and stored pictures for a good match or prediction for the current macroblock. The displacement between the macroblock in the reference picture co-located with the current macroblock and the region of pixels used for prediction of the current macroblock is known as a motion vector. Some standards only allow one motion vector per macroblock, whereas others allow the macroblock to be subdivided and different reference pictures and different motion vectors to be selected and encoded for each sub-division.

An alternative to using prediction from a previous picture, known as inter coding, to encode a macroblock, is to encode the macroblock without reference to a previously encoded picture. This is called intra coding. In early compression standards this was achieved simply by missing the subtractor and transforming and quantising the source picture directly. In later standards, various forms of spatial prediction, using already coded pixels of the current picture, are used to remove redundancy from the source macroblock before the transform and quantisation processes.

The difference between the source picture and the prediction, known as the prediction error, or prediction residual, is usually transformed to the frequency domain using a block based transform, and is then quantised with a scalar quantiser, and the resulting quantised coefficients are entropy coded.

A range of scalar quantisers is usually available to allow the distortion introduced by the quantisation process to be traded off against the number of bits produced by the entropy coding in order to meet some pre-determined bit rate constraint, such as to achieve a constant bit rate for transmission over a constant bit rate network.

A number of international standards for video coding and decoding have been promulgated, notably the H series of standards from the ITU and the ISO/IEC MPEG series. The algorithm used to select the scalar quantiser for a given block of the prediction error is outside the scope of the video compression standards.

According to the present invention there is provided a method of coding a video signal, comprising:

(a) analysing pictures to obtain, in respect of each region thereof analysed, a measure of predictive power, each measure being dependent on the similarity of the region to another region for which it is a potential predictor, and (b) coding the signal, using differential coding, with a resolution that varies as a function of the measures of predictive power.

Other aspect of the invention are defined in the claims.

BRIEF DESCRIPTION OF THE DRAWINGS

Some embodiments of the invention will now be described, by way of example, with reference to the accompanying drawings, in which.

DETAILED DESCRIPTION OF PRESENT EXAMPLE EMBODIMENTS

Figure 1:
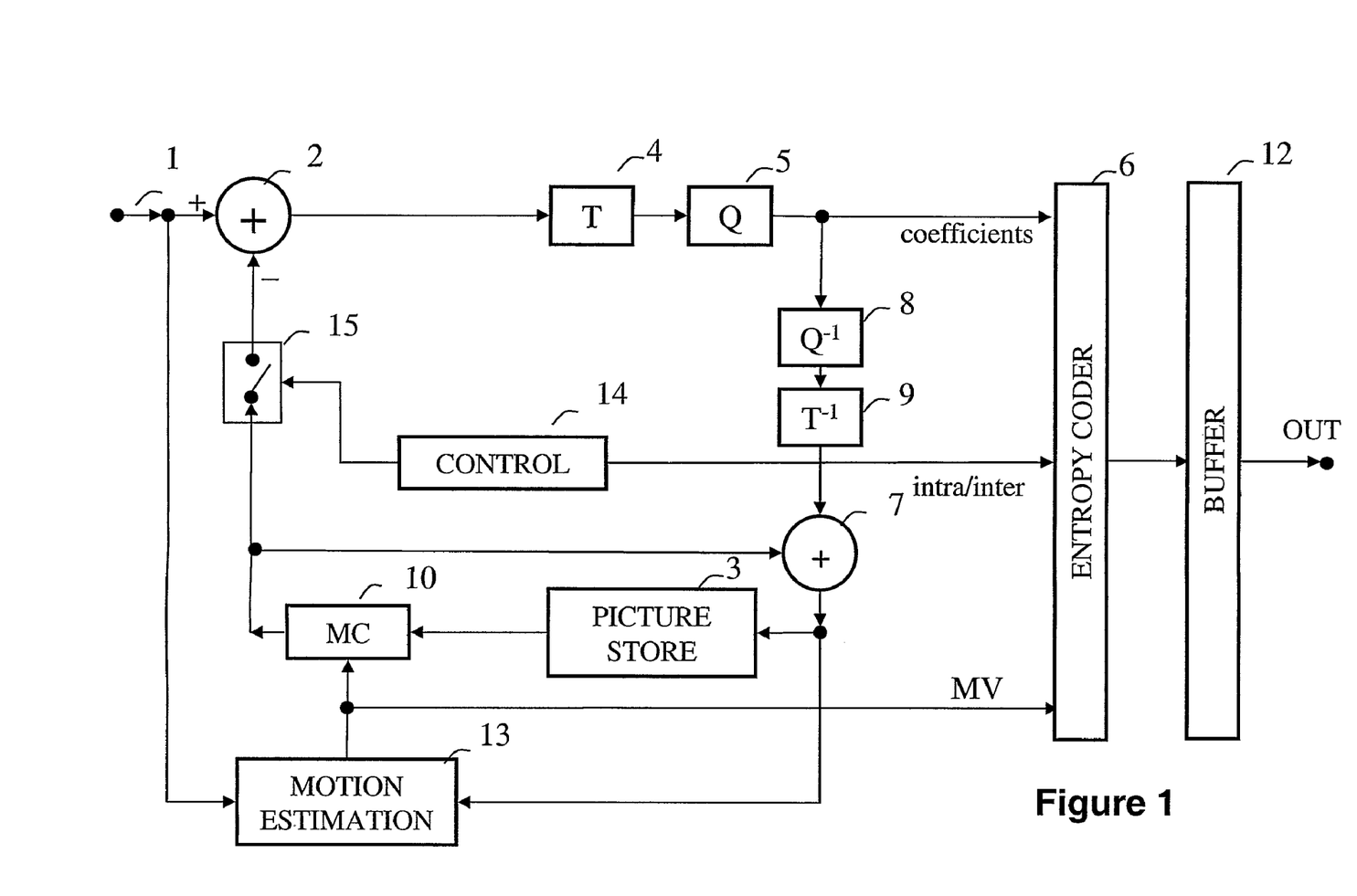
FIG. 1 is a block diagram of a known form of video coder, also used in embodiments of the invention.

FIG. 1 shows the architecture of such a hybrid motion compensated transform coder (prior art). Video signals (commonly in digital form) are received at an input 1. A subtractor 2 forms the difference between the input and a predicted signal from a predictor buffer 3 which is then further coded. The coding performed here may include transform coding 4, thresholding (to suppress transmission of zero or minor differences), quantisation 5, and/or variable length coding 6, for example. The input to the predictor store 3 is the sum, formed in an adder 7, of the prediction and the coded difference signal decoded at 8, 9 (so that loss of information in the coding and decoding process is included in the predictor loop). The inverse quantiser 8, inverse transform 9 and adder 7, along with the store 3 and motion compensation 10 form a local decoder.

Figure 2:
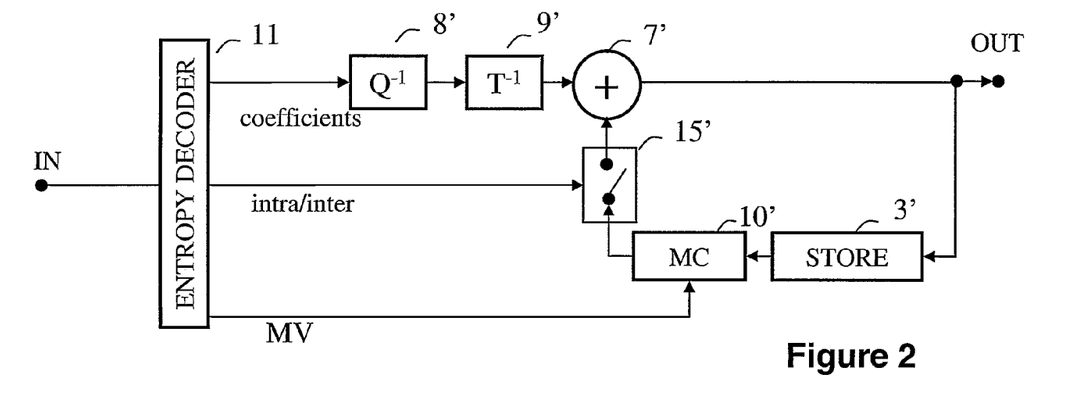
FIG. 2 is a block diagram of a known form of video decoder.

FIG. 2 shows the decoder. A variable-length decoder 11 is followed by inverse quantiser 8' and inverse transform 9' which produce an inter-frame difference signal. This then added at 7' to a prediction from a frame store 3' after motion compensation in a motion compensation unit 10' which receives the motion vectors from the encoder. The output of the adder 7' forms the decoder output and is also fed to the input of the frame store 3'.

Buffering may be provided at the encoder output (12) and decoder input (not shown) to permit transmission over a constant bit-rate channel. A motion estimator 13 is also included. This compares the frame of the picture being coded with the predictor frame: for each block of the current frame (into which the picture is regarded as divided) it identifies that region of the previous frame which the block most closely resembles. The vector difference in position between the identified region and the block in question is termed a motion vector (since it usually represents motion of an object within the scene depicted by the television picture) and is applied to the motion compensation unit 10 which serves to shift the identified region of the previous frame into the position of the relevant block in the current frame, thereby producing a better prediction. This results in the differences formed by the subtractor 2 being, on average, smaller and permits the coding at 4, 5 to encode the picture using a lower bit rate than would otherwise be the case.

This coder does not always used inter-frame coding, however. The H.261 standard provides that the coder makes, for each macroblock, a decision as to whether that macroblock is to be coded using motion-compensated inter-frame differential coding, or whether it is more economical on bits to use intra-frame coding for that macroblock. This decision is taken by a control unit 14: if intra-frame coding is to be used, the "previous picture" prediction is no longer fed to the subtractor. This is indicated schematically in FIG. 1 by a switch 15. The decision is also signalled to the decoder where it controls a similar switch 15'. According to the standard, intra coding can, instead of simply coding up the actual pixel values, invoke intra-frame differential coding using predictions from previously decoded pixels within the same picture. This is not however shown in the drawing.

Consider a video scene that consists of a detailed image that is either stationary or translates very slowly. A typical approach to the selection of a scalar quantiser to meet a bit rate constraint is to use a fixed number of bits to code each picture. If this were applied to this type of scene, then the first picture would be compressed quite poorly as there is a lot of detail to be encoded, which with the bit rate constraint implies the need for a coarse scalar quantiser. And later pictures, as the motion prediction works better, would steadily have better quality, as the bits used to code each picture are being used to refine the prediction error.

We observe that the first picture does provide a good prediction for the rest of the scene, that is, it has high "predictive power". Consequently it is noted that any improvement in the quality of the first coded picture will be inherited by the subsequent pictures without the need for additional bits representing residual information to be encoded. In other words, bits spent encoding the first picture well are also benefiting the later pictures because of the "predictive power" of the first picture.

So, for a given constraint on the total number of bits to encode the scene, the first approach results in a low quality first picture, and a steady improvement in quality over the rest of the scene, while by allocating more bits to the first picture, all of the scene can be encoded well with the same total number of bits.

Traditionally, video is encoded in display order, while the usefulness of a picture for prediction clearly depends on pictures in the future, which are not yet available in the encoder. Thus, a first embodiment of the invention uses a two pass encoding technique, with the first pass being backwards. It is therefore useful for off-line encoding of stored video, but is not useful for live encoding where there is a strict delay constraint.

Note that two pass encoding is well known in itself, as is multi-pass encoding. For example Fert et al (U.S. Pat. No. 6,411,738) perform a preliminary analysis of a video sequence and make an overall adjustment to quantisation stepsize such that the sequence will fit within a predetermined limit (e.g. will fit on a standard size DVD). Yokoyama et al. ("A rate control method with preanalysis for real-time MPEG-2 video coding", *Proceedings of the* 2001 *International Conference on Image Processing*, IEEE, vol 3, pp. 514-517) discuss prior proposals for preanalysis performed with a view to allocating bits according to coding complexity, and then offer proposals for real-time coding in which they preanalyse during a sliding delay window. Cougnard et al. (US patent publication 2003/0031255A) compute statistical results on a first pass which are then used to optimise bit rate allocation and buffer management during a second pass. Finally, Ruol (US patent publication 2003/0156642A) checks on a first pass for "blocky" frames and readjusts bit allocation to reduce them. In the prior art the passes are always in forward order.

Because the first pass of encoding is backwards, the first picture passed to the encoder is the last in the video sequence, and the last picture passed to the encoder is the first in the video sequence; while the second pass of is in the conventional forward direction.

By processing the video sequence backwards in the first pass, when a given picture is being processed, the pictures that would normally be predicted from it have already been passed through the encoder, and so the encoder knows about them and so can determine how useful the given picture is for predicting the normally later pictures. This is illustrated below:

Source picture order: P0 P1 P2 P3 P4 P5 P6
First encoding pass: P6 P5 P4 P3 P2 P1 P0
Second encoding pass: P0 P1 P2 P3 P4 P5 P6

When picture P3 is coded in the first encoding pass, P6 to P4 have already been processed, and knowledge about them stored. On the second pass when P3 is coded, this stored knowledge about P4 to P6 can be used to set the encoding parameters for P3.

The technique relies on the assumption that if P4 is a good reference picture for coding P3, then P3 would be a good reference picture for coding P4. This assumption is generally found to be reasonable.

The "predictive power" of a picture is a concept introduced here. We define it as a numerical value that indicates how useful a given pixel in a picture is for predicting other pixels in a video sequence. Typically this will be pixels of subsequent picture, but the principle could also be applied in cases of prediction from later pictures, and indeed to prediction of pixels within the same picture.

The inventors have identified a number of ways of determining numerical values for "predictive power" during the first, backwards, encoding pass through the video sequence. Note that these are different ways of calculating different numerical values representing the same underlying concept.

The basis to each of the techniques is as follows.

As pictures are passed through the encoder in the first pass, they are encoded as normal and coded bits are stored. In this example, the encoder used is an unmodified H.261 encoder, as in FIG. 1; however, for simplicity, in this version, the use of B-frames is not permitted. Note in particular that the precise criterion for making the decision as to whether that macroblock is to be coded using motion-compensated inter-frame differential coding, or whether it is more economical on bits to use intra-frame coding for that macroblock, is not mandated by the standard. In our preferred implementation, the intra/inter decision is made by comparing the sum of absolute differences from the motion estimation with an estimate of the intra variance. This is not actually the true variance as what is done in practice is to calculate the mean luminance value for a macroblock and then calculate the variance as the sum of absolute differences between each pixel in the macroblock and the mean of the pixels for the macroblock.

```
if (best_soad < intra_var + 500)
{
    coding_type = inter;
}
else
{
    coding_type = intra;
}
```

H.264 intra provides a selection of spatial prediction modes for improved efficiency. In H.264, the algorithm we use to select the spatial prediction mode depends on the configuration of the encoder and, in particular, how much processing power is available for encoding. In one case we compare the inter sum of absolute differences plus a rate factor reflecting the motion vector and macroblock mode bits, with the intra sum of absolute differences plus a rate factor. When more processing power is available, we fully encode a macroblock in intra mode and various inter modes, and choose the one that gives the best combination of actual distortion on the reconstructed image and the actual number of bits generated In an intermediate step before the second forward encoding pass, the coded bits are decoded by a decoder. This is however, not a standard decoder: rather, it has a structure similar to that of an H.261 decoder, but with significant modifications to enable it to implement the "predictive power" calculation, and "predictive power" pictures are output.

In our current prototype implementation, "predictive power" pictures are actual video files that can be viewed using the same applications that are used to view any uncompressed video file. White is used to indicate good predictive power, black is used to indicate poor predictive power, and the shades of grey the values between the extremes. This has proved useful for viewing the "predictive power" information, but is not necessary: the "predictive power" information could be stored in any suitable file format.

In the second encoding pass, the encoder reads the source pictures in forward order and the "predictive power" pictures in reverse order, so that both refer to the same actual picture, and uses the information in the "predictive power" picture to set encoding parameters in the encoding process for encoding the source picture. In particular, it feeds a control input to the quantiser 5 (FIG. 1) to control the quantiser step size.

Figure 3:
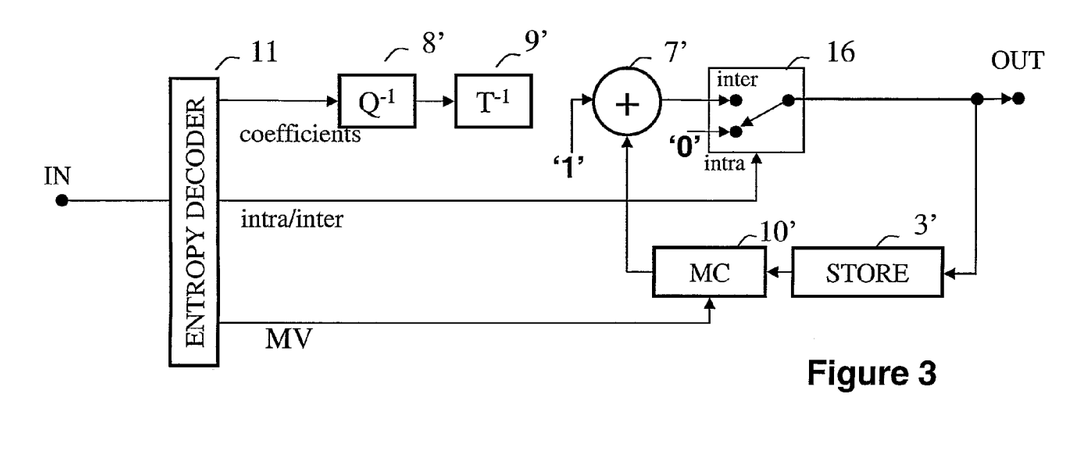
FIG. 3 is a block diagram of a decoder used in a first embodiment of the invention.

A decoder suitable for the implementation of the "intermediate step" as above is shown in FIG. 3. It receives the coded bitstream output from the first encoding pass and entropy decoding (11) is performed as normal to deduce for each coded macroblock (16×16 pixel region) the coded mode (intra or inter), the motion vectors (if present) and the quantised transform coefficients. If the macroblock is intra coded, the other information from the bitstream is ignored (switch 16 set to zero input) and the macroblock is reconstructed as having all zero valued pixels (black pixels). If the macroblock is inter coded, the quantised transform coefficients are ignored, and the inverse quantised inversed transformed residual pixels are all set to the value one, and inter prediction, using the decoded motion vectors and the previously decoded "pictures" is carried out as normal (switch 16 set to adder output). The pictures resulting from this decoding process are the "predictive power" pictures.

The reasoning behind this algorithm is that intra coding is indicative of the prediction process not working well, if at all, thus causing a reset to zero of the predictive power of the associated pixels. While inter coding is indicative of the prediction process working well, thus causing the predictive power of the macroblock's pixels to be an increment to the predictive power of the pixels that were used as its reference pixels.

A second embodiment of the invention is similar to the first but instead of the Intra/Inter Technique for determining the predictive power of a picture it uses a Prediction Residual Technique. The first pass encoding is however modified in that, because intra coding is considered to give no indication of predictive power, intra coding is only allowed for the first picture and for scene changes—it is not used for any macroblocks in inter coded pictures even if this would result in better compression, as the aim at this stage is to determine the predictive power of the macroblock, using a technique that looks at inter coded residuals. Note that in recent compression standards, intra coding can sometimes be a more efficient encoding technique than inter coding for a macroblock due to its use of spatial prediction.

To optimise this technique, the first encoding pass should preferably use a fine quantisation to avoid many quantised residuals being zero. In fact, if this technique is applied in the first pass rather than as an intermediate step, the actual prediction residuals are available before quantisation.

Figure 4:
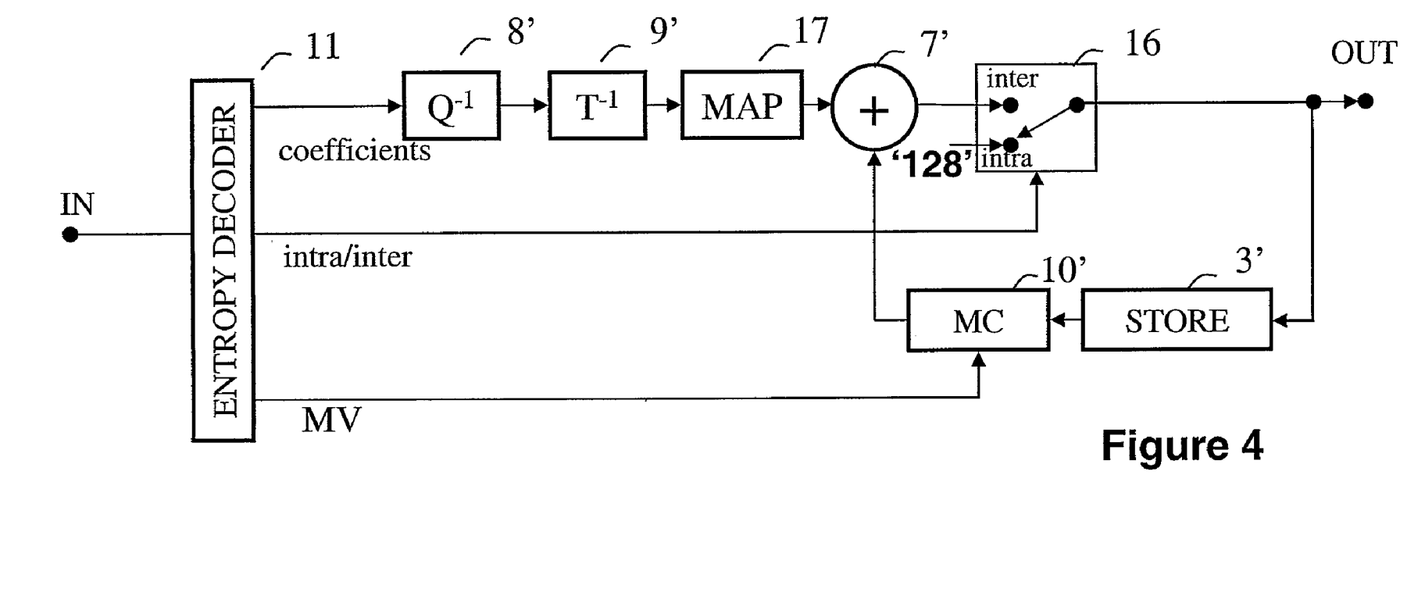
FIG. 4 is a block diagram of an alternative decoder used in a second embodiment of the invention.

Turning now to the implementation of the "intermediate step", this is performed using the decoder shown in FIG. 4.

The coded bitstream output from the first encoding pass is input to a decoder. Entropy decoding 11 is performed as normal to deduce for each coded macroblock (16×16 pixel region) the coded mode (intra or inter), the motion vectors (if present) and the quantised transform coefficients. If the macroblock is intra coded, the other information from the bitstream is ignored and the macroblock is reconstructed as having all pixels with value 128 (mid-grey pixels) (switch 16 in lower position). If the macroblock is inter coded, the quantised transform coefficients are decoded as normal using the inverse quantisation and inverse transform processes (switch 16 in upper position). The resulting prediction residual pixels are then mapped at 17 to "predictive power" residuals using a pre-defined mapping process. Then inter prediction, using these residuals and the decoded motion vectors and the previously decoded pictures is carried out as normal. The pictures resulting from this decoding process are the "predictive power" pictures.

There are a number of possibilities for the above mentioned pre-defined mapping process. In all cases a small residual resulting from the inverse quantisation and inverse transform processes leads to a positive "predictive power" residual and a large one leads to a negative one (or obviously the complete opposite, with subsequent opposite interpretation of the "predictive power" pictures).

One possibility is a fixed mapping. The one we have implemented is shown below. The variable "real_residual" refers to the magnitude of the actual residual obtained at the output of the inverse transform.

```
int fixed_predictive_power_mapping(int real_residual)
{
    int predictive_power_residual;
    if (real_residual < 4)
    {
        predictive_power_residual = 2;
    }
    else if (real_residual < 8)
    {
        predictive_power_residual = 1;
    }
    else if (real_residual < 10)
    {
        predictive_power_residual = 0;
    }
    else if (real_residual < 20)
    {
        predictive_power_residual = -10;
    }
    else if (real_residual < 40)
    {
        predictive_power_residual = -20;
    }
    else
    {
        predictive_power_residual = -255;
    }
    return predictive_power_residual;
}
```

But this can suffer from the problem that the mapping may not be optimal for the given sequence, and that very quickly the "predictive power" pictures will become either mostly white (255) or mostly black (0) as there is no normalisation of the mapping to the given pictures. Note the decoding process clips the output pixels to the range 0 to 255 regardless of the prediction and the (mapped) residual values.

Another possibility is to calculate the mapping independently for each picture such that the net effect of decoding is a zero or near to zero change to the average decoded pixel value. This is 128 after an intra picture and will stay about this level, as some pixels get lighter and some get darker. In our implementation, we divide the range of residuals into five percentile ranges (0-20%, 20-40% etc), use a fixed mapping for the first two, map the middle range to zero, and scale the mapping for the last two such as to achieve a near zero mean.

This is illustrated in the pseudo-code below. Real residuals in the lowest 20% percentile map to a predictive power residual of +4, those between 20% and 40% to +2, those between 40% and 60% to zero, those between 60% and 80% to −1 times scale_factor and those between 80% and 100% to −2 times scale factor. Scale_factor is chosen to achieve a mean near to zero for the predictive power residuals. Note that the number of real residuals in each of these percentile ranges is not necessarily 20%! This is because many have the same small values, for example, it is not unusual for 50% or more to be zero. This is why the middle range is checked first in the pseudo-code: to ensure that real residuals with a value in the middle 20% percentile are mapped to a predictive power residual of zero.

Accumulate histogram of real residual values.
Store the values of the real residuals, r20, r40, r60, r80 at the boundary of each of the 20% percentile ranges. Note that the x % percentile boundary rx is the value such that x % of pixels have a residual that is less than or equal to it. It follows that where (as can often happen)50% or more of pixels have a residual of zero, then r20 and r40 will both be zero.
Determine the number of pixels, n20, n40, n60, n80 and n100 in each of the percentile ranges.
Calculate a scaling factor for the two higher percentile ranges as follows:

scale_factor=−(4*n20+2*n40)/(n80+2*n100)

Map each real residual to a predictive power residual as follows:

```
if ((real_residual >= r40) && (real_residual <= r60))
{
    // 40% to 60%
    predictive_power_residual = 0;
}
else if ((real_residual >= r20) && (real_residual < r40)
{
    // 20% to 40%
    predictive_power_residual = 2;
}
else if (real_residual < r20)
{
    // 0% to 20%
    predictive_power_residual = 4;
}
else if ((real_residual > r60) && (real_residual <= r80))
{
    // 60% to 80%
    predictive_power_residual = −1 * scale_factor;
}
else
{
    // 80% to 100%
    predictive_power_residual = 2 * scale_factor;
}
```

The picture adaptive method suffers from the fact that no sequence level information is gained as after processing any number of pictures the mean "predictive power" of a picture is unchanged. Hence it is difficult or impossible to distinguish hard to predict sequences from easily predicted ones.

Hybrids of these two mappings may offer better overall performance.

The final stage of the process is using the Predictive Power of a Picture in the Second Encoding Pass. This step uses a standard encoder, as in FIG. 1, except that the predictive power results are used to control the quantisation. The basic idea is that if a macroblock has a high "predictive power" (formed by averaging the "predictive power" of its constituent pixels), then by coding it well with a fine quantisation, then the (larger number of) bits will be well spent, as the resulting high quality encoding of the macroblock will be inherited by subsequent pictures that are predicted from it.

So in general, the quantisation parameter for a macroblock is set according to a pre-determined mapping from the "predictive power" of the pixels comprising the macroblock.

So in one possible embodiment, a fixed mapping between the "predictive power" and the quantisation parameter offset is used. The quantisation parameter for the macroblock is then determined by adding the quantisation parameter offset to some base quantisation parameter selected for the picture, which may be a fixed value, a picture dependent value, or a value determined by some bit rate constraint etc. Note than, in principle, the predictive power results obtained as described above—on a pixel-by-pixel basis—could, in principle be used to determine a quantisation parameter for each pixel separately. However we prefer to average the results for an entire macroblock and translate this into a single quantisation parameter for the whole macroblock. In fact, most standards will allow the quantisation index to be changed only at the macroblock level.

One possible mapping is that if the average prediction power exceeds 128 then the quantisation offset is the negative amount (128−average_pp)/16; otherwise the quantisation offset is zero. This formulation is suitable for an H.264 quantiser, which has a range 0 to 51 (for 8 bit video samples) for the quantiser index, with the step size relating to it by an exponential (step size proportional to 2^(quantiser index/6), i.e. step size doubles for every six increments). So a quantisation offset in H.264 corresponds to a scaling of the step size.

This is not so for the standards before H.264 (H.261 etc.), where a different relationship would be needed to achieve the same result. These earlier standards had a quantiser index range from 1 to 31, with the step size being proportional to the quantiser index (step size=2*quantiser index).

A difficulty that can arise with this implementation, which applies this independently to each picture, is that where parts of the picture have high "predictive power" in several consecutive pictures, those parts are coded well in every picture, consuming many bits due to (minor) motion prediction failures and/or noise in the video source, while other parts are repeatedly coded with lower quality. This may cause slow moving/noisy background to be coded well and less "predictable" foreground objects, particularly human eyes and mouths, to be coded badly.

In some circumstances, the regions of the picture with low "predictive power" may be the most important subjectively, and it would be better to apply the "predictive power" information in the exact opposite way to that initially envisaged, and coding those parts that will not be used for prediction well.

A compromise that has been found to work reasonably well in practice is to apply the "predictive power" information to every nth picture in the manner just described and to all other pictures in the reverse sense. So the regions of the picture that are good for subsequent prediction are coded well in the first picture (that is to say, the first of a series of such pictures), but are coded with coarser than average quantisation in the next (n−1) pictures, before repeating again; while the other regions are coded uniformly throughout the sequence. n can be chosen using information deduced in the first encoding pass, such as the size of the motion vectors and the size of the prediction residuals, with slow motion and/or small residuals allowing n to be large. The regions of the first picture that are coded well are used for predicting the next (n−1) pictures, and due to the use of coarser quantisation in the corresponding macroblocks of these pictures, most (hopefully all) transform coefficients can be quantised to zero resulting in a very efficient coding (such as "skip mode" when no information is encoded for the macroblock).

This is illustrated in the pseudo-code below. For every nth picture, the quantisation offset is as stated above. For the intervening pictures, the sign of the quantisation offset is reversed. In our prototype implementation, we used a single cycle of picture numbers for the whole picture. If desired, however, this code could be run separately for each macroblock to be coded, in which case a picture that is the first of a sequence of high predictive power as far as one macroblock is concerned may not be the first for some other macroblock.

```
Calculate the sum, sum_pp, of "prediction power" values for
each pixel in the macroblock
    // Normalise with rounding the sum back to equivalent for
a single pixel
    sum_pp = (sum_pp + 128) >> 8;
    if (0 == (picture_number % n))
    {
        if (sum_pp > 128)
        {
            quant_offset = (128 − sum_pp) >> 4;
        }
        else
        {
            quant_offset = 0;
        }
    }
    else
    {
        if (sum_pp > 128)
        {
            quant_offset = (sum_pp − 128) >> 4;
        }
        else
        {
            quant_offset = 0;
        }
    }
```

Variations

The above describes the current prototype implementation, which is attractive inter alia in that it makes use, to a considerable degree, of conventional coder and decoder configurations. Clearly however there are stages that could be omitted from the first pass and intermediates stage, such as the entropy coding/decoding, and stages 8' 9' and 11' in FIG. 3 which are not used at all. In a commercial implementation the intermediate step does not need to be separate but could be part of the first encoding pass. In other words, the first encoding pass could generate normal decoded pictures for subsequent prediction and output "predictive power" pictures using information generated in the encoding process. In fact this approach is more general in that it allows any encoding parameters to be used to generate the "predictive power" pictures whereas the use of the intermediate step limits the "predictive power" pictures to depend only on information in the first pass encoded bitstream, unless yet more information is stored during the first encoding pass.

In the first embodiment described above (Intra/Inter technique) for determining Predictive Power, one is essentially using the existing encoder decision mechanisms that decide whether to use intra or inter coding, and then, in the intermediate stage, using the decoder predictor loop simply to accumulate the PP scores. One could achieve the same Predictive Power figures by recording these decisions in the encoder and eliminate the decoding step. The recording would be:

if decision=INTRA then PP(x,y)=0
if decision=INTER then PP(x,y)=PP(x+$m_x$,y+$m_y$)+1
where $m_x$, $m_y$ is the relevant motion vector.

Note that in some applications, pictures are coded in a pattern known as BBP where the P picture is coded before the temporally earlier B pictures, the P picture is used as a reference picture and the B pictures are not used for reference. The restriction mentioned earlier, that B-pictures were not permitted, is not essential, and B-pictures may be used if desired. In such cases, as the B pictures are not used as reference pictures, they are excluded from the predictive power calculation, which is only performed on the P pictures (and any Intra (I) pictures that are coded). In H.264, whether a picture (or a slice of a picture) is bi-directionally predicted (as in conventional B pictures) and whether it is marked as being a reference picture are independent. So when we use H.264, pictures that are used for reference are included in the predictive power calculation, regardless of whether or not they use bi-directional prediction.

Furthermore, the scheme can also work if the first pass runs forwards. One could accumulate PP scores until they drop to zero when an intra-coded macroblock is encountered: the scores could then be propagated back. Thus, for a particular macroblock, one might get a sequence of frames IPPPPPI (where here the I or P is not the frame type but the type of prediction in use for that macroblock) for which the PP score, on a forward scan, was (using the first method) 0123450 and this would then have to be translated into actual scores 54321X (where X is unknown because it depends on what follows). This process could be used on live feeds provided the feed was buffered sufficient to provide an adequate window for this. Naturally this process would have to be truncated if a frame's utility as a predictor exceeded the window length.

The use of a forward first pass could be of particular value in simplifying computation of the predictive power in cases where multiple alternative reference frames are allowed. Where they are allowed, it becomes possible for a pixel to be used as a predictor for two or even several other frames: in such a case the predictive power would be a combination (e.g. the sum) of the predictive powers computed for the two or more predictions separately.

The above description envisages that the resolution is varied by controlling the quantisation. However, instead (or in addition) one may vary the spatial resolution, for example by variable subsampling, or (in a transform-based system) by varying the number of coefficients transmitted.

The invention claimed is:

1. A method of coding a video signal, comprising:
(a) analysing pictures to obtain, in respect of each region thereof analysed, a measure of predictive power, each measure being dependent on the similarity of the region to another region for which it is to be used as a predictor, wherein the said other region for which the respective region is to be used as a predictor is a region of another frame, and
(b) coding the signal, using a computer processor implementing a differential coding including inter-frame differential coding, with a quantisation parameter that varies as a function of the measures of predictive power;
wherein each measure of predictive power is calculated cumulatively in that, when a region is similar to the region for which it is to be used as a predictor, the measure depends also upon the measure calculated in respect of the latter region, and
wherein the analysing comprises:
performing a trial coding of the signal;
examining the results of the trial coding to determine for each region whether it meets a criterion of similarity to the region for which it is a potential predictor, wherein the criterion of similarity is that the flag in respect of a region for which the region under consideration is, in the trial coding, used as predictor, is indicative of a decision to use inter-frame coding;
if the criterion is met, adjusting at least one stored value for the measure of predictive power in respect of that region; and
if the criterion is not met, setting said a least one stored value for the measure of predictive power to a fixed amount.

2. A method according to claim 1 in which the said other region for which the respective region is to be used as a predictor is a motion-compensated region of another frame.

3. A method according to claim 1 in which
the trial coding is performed by a video coder that makes a decision for each region as to whether that region is coded by inter-frame differential coding or not, and include in its output a flag so indicating; and
the augmenting of the stored value(s) comprises incrementing the value(s) by a fixed amount.

4. A method according to claim 1 in which
the trial coding is performed by a video coder that makes a decision for each region as to whether that region is to be coded by inter-frame differential coding or not, and included in its output a flag so indicating; and
the augmenting of the stored value(s) comprises adjusting the value(s) by an amount equal to, or a monotonic function of, the magnitude of the prediction residual.

5. A method according to claim 1 in which the trial coding is performed in reverse order to the eventual coding.

6. A method according to claim 5 in which
the trial coding is performed by a video coder that makes a decision for each region as to whether that region is coded by inter-frame differential coding or not, and include in its output a flag so indicating;
the criterion of similarity is that the flag in respect of the region under consideration is indicative of a decision to use inter-frame coding; and
the augmenting of the stored value(s) comprises incrementing the value(s) by a fixed amount.

7. A method according to claim 5 in which
the trial coding is performed by a video coder that makes a decision for each region as to whether that region is to be coded by inter-frame differential coding or not, and included in its output a flag so indicating;
the criterion of similarity is that the flag in respect of the region under consideration is indicative of a decision to use inter-frame coding;
the augmenting of the stored value(s) comprises adjusting the value(s) by an amount equal to, or a monotonic function of, the magnitude of the prediction residual.

8. A method according to claim 1 in which the measures of predictive power are generated in respect of individual picture elements and averaged to obtain a single measure for a region.

* * * * *